June 8, 1948.   B. BOGOSLOWSKY   2,442,948
APPARATUS FOR MAKING CONVOLUTE WOUND TUBING
Filed March 13, 1946   2 Sheets-Sheet 1

INVENTOR.
Boris Bogoslowsky
BY Emery, Varney, Whittemore & Dix
ATTORNEY

June 8, 1948.  B. BOGOSLOWSKY  2,442,948
APPARATUS FOR MAKING CONVOLUTE WOUND TUBING
Filed March 13, 1946  2 Sheets-Sheet 2

INVENTOR.
Boris Bogoslowsky
BY Emery Varney Whittemore Dix
ATTORNEY

Patented June 8, 1948

2,442,948

UNITED STATES PATENT OFFICE 2,442,948

APPARATUS FOR MAKING CONVOLUTE WOUND TUBING

Boris Bogoslowsky, Jackson Heights, N. Y.

Application March 13, 1946, Serial No. 654,035

5 Claims. (Cl. 93—81)

This invention relates to apparatus for making convolute wound tubing from sheet materials.

It is an object of the invention to provide apparatus in which sheet materials consisting in whole or in part of thermoplastic materials may be formed into convolute wound tubings, heat sealed, and printed in one continuous, uninterrupted operation.

Other objects and advantages of the invention will appear hereinafter.

A preferred embodiment of the invention selected for purposes of illustration is shown in the accompanying drawings, in which, Figures 1 and 1a (taken together) are a side elevation of the apparatus.

Figure 1:
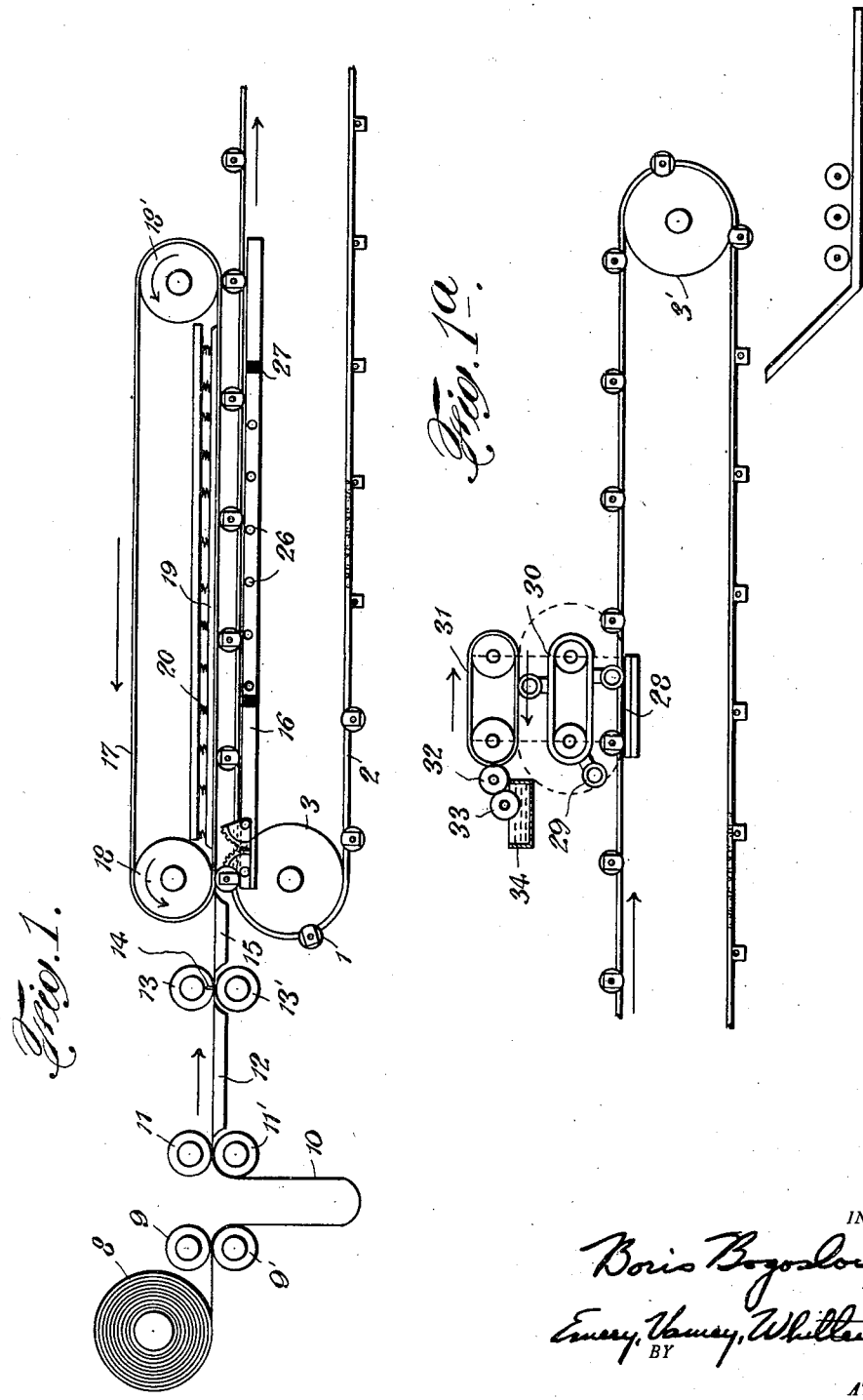
Figure 2:
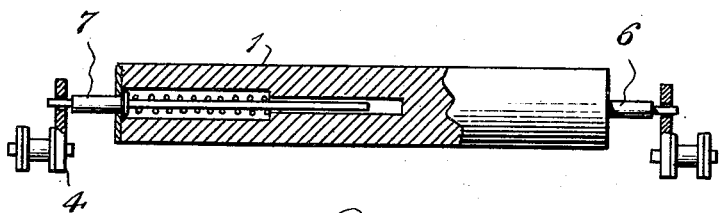
Figure 2 is a side view, partly in section, of a mandrel.
Figure 3:
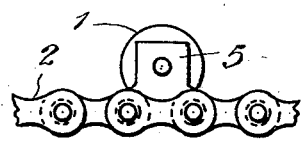
Figure 3 is an end view of a mandrel.

In my copending application Serial No. 560,705, filed October 27, 1944, patented July 29, 1947, Patent No. 2,424,540, I have disclosed apparatus for forming convolute wound tubings from sheet materials consisting in whole or in part of thermoplastic materials in which such tubings are wound on mandrels and are rolled along a heated bed plate to heat seal the convolute windings. Reference to said copending application may be had for a full disclosure of the details of such apparatus.

In the apparatus disclosed in my copending application, a supply of mandrels is kept on a shelf and each mandrel is elevated to winding position by means of a feeding member. According to the present invention, the mandrels are carried on a conveyor chain and are moved to winding position thereby.

Thus, referring to the drawings, the mandrels I are carried on chains 2, 2', and are constructed so as to be easily inserted and removed. Thus, I employ a standard type of chain having selected links 4 provided with upstanding lugs 5. The mandrels I are provided with axial spindles 6 and 7, the spindles 6 being fixed on one end of the mandrels and the spindles 7 being resiliently mounted on the other end. The spindles fit into apertures drilled in the lugs 5, and the mandrels may be inserted and removed merely by manipulating the spindles 7. The mandrels rotate freely, of course.

The chains 2, 2' are carried on sprockets 3, 3', the sprocket 3 being located to elevate the mandrels to winding position in the same manner as the mandrel feeding means of my copending application.

The sheet material to be wound may be fed to the winding position in any suitable manner, either automatically or by hand. For purposes of illustration I have shown a simple type of feed identical with that shown in my copending application in which a continuous strip of sheet material is fed from a roll 8 by a pair of rollers 9, 9' which rotate continuously. The material is fed into a loop 10 from which it is withdrawn by a pair of feed rollers 11, 11' which preferably rotate intermittently to feed the material along a table 12 to another pair of feed rollers 13, 13' one of which carries a cutting knife 14 adapted to sever the continuous strip into sheets of the desired length. Each complete rotation of the rollers 13, 13' deposits a severed sheet of material of the required length on the table 15 in position for the beginning of the winding operation. The rollers 13, 13' are connected to rotate with the rollers 11, 11' and both sets of rollers are rotated in timed relation with the chains 2, 2'.

A rolling table 16 is arranged to engage the mandrels as they are elevated to winding position by the chains 2, 2'. Immediately above the rolling table is a driven rolling member in the form of a conveyor, comprising a belt 17 mounted on rollers 18, 18' with the lower stretch of the belt spaced from the table 16, with one end of the conveyor extending over the winding position so as to engage the mandrel when it is elevated by the chains 2, 2'. Preferably a shoe 19 engages the lower stretch of the belt and is pressed against the belt by springs 20 to hold the mandrels in engagement with the rolling table. The belt moves continuously at a rate substantially equal to the rate of movement of the chains 2, 2'.

Figure 4:
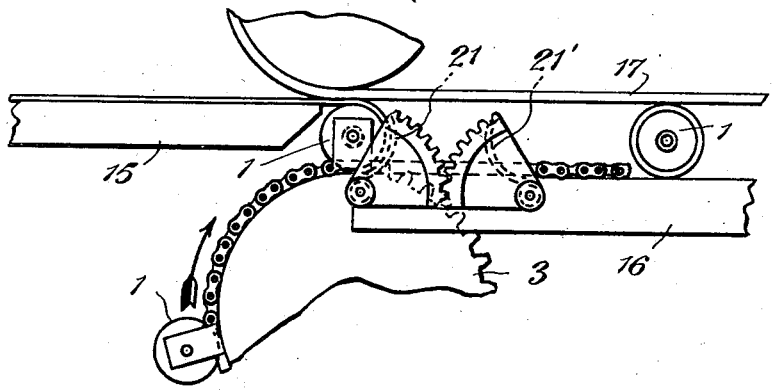
Figure 4 is an enlarged view showing the winding position.

When the chains 2, 2' have raised a mandrel to winding position as shown in Figure 4, the mandrel presses the end of a sheet of material against the belt 17 and the winding operation begins, the guide fingers 21, 21' serving to guide the material circumferentially of the mandrel as explained in detail in my copending application.

The mandrel is now rolled along the table 16 by the cooperative action of the chains 2, 2' and the conveyor belt, the rolling action being such as to cause the sheet material to tighten itself on the mandrel due to the creep of the material as the mandrel is rolled between the two surfaces. At any suitable location along the table a heated surface may be provided by placing suitable heating elements (either electrical or steam) in passages 26, the heated section of the table being separated from the other portions by insulation 27. In the case of thermoplastic materials or in the case of non-thermoplastic materials coated or laminated with thermoplastic materials, the temperature of the heated surface may be controlled to cause the plies of the tubing to be heat sealed throughout the circumference if the tubing, such sealing taking place, of course, while the material continues to be tightened on the mandrel by the rolling action as previously described.

The heated section of the table may be of any length required for sealing purposes, and after the mandrels reach the end of the rolling table, they are carried to the printing station by the chains 2, 2'. The printing apparatus comprises printing plate 28 supported in any suitable manner at a level to be engaged by the mandrels. As the mandrels reach the printing plate, they are rolled across the plate by the chains 2, 2' to cause an ink impression to be imprinted on the tubular surfaces.

The plate is reinked between successive impressions by ink rollers 29 carried on chains 30, which said rollers are spaced at distances equal to the spacing of the mandrels. The chains 30 move at the same rate as the chains 2, 2'. The ink rollers, in turn, are reinked by contact with an ink belt 31, located above the chains 30, which said belt moves at a rate at least twice that of the chains 30. The ink belt is in contact with a roller 32, which, in turn, is in contact with a roller 33 projecting into the ink supply maintained in the tank 34.

If it is desired to print more than one color, it will be understood that additional printing stations may be supplied, using printing apparatus similar to that previously described, the mandrels being carried from one station to the next by the chains 2, 2'.

In operation, the tubings are wound, heat sealed and printed in a continuous, uninterrupted manner, being carried along continuously by the chains 2, 2'. In this connection, it may be noted that the mandrels absorb a certain amount of heat while passing through the heat sealing zone, and that the heat remaining in the mandrels after the tubings have received the printing impression assists in drying the printing.

It will be understood that the invention may be variously modified and embodied within the scope of the subjoined claims.

I claim as my invention:

1. Apparatus for making convolute wound tubing from sheet material comprising, a continuously moving conveyor, a plurality of mandrels removably mounted on said conveyor and freely rotatable thereon, means for winding and heat sealing convolute wound tubings on successive mandrels, and means for printing the surface of said tubings while still carried by said conveyor in continuous movement therewith.

2. Apparatus for making convolute wound tubing from sheet material comprising, a continuously moving conveyor, a plurality of mandrels removably mounted on said conveyor and freely rotatable thereon, means for winding and heat sealing convolute wound tubings on successive mandrels, and a printing plate extending in a direction parallel to one stretch of said conveyor at a level such that said mandrels engage said plate along said stretch and are rolled along said plate by the continuous movement of said conveyor.

3. Apparatus for making convolute wound tubing from sheet material comprising, a continuously moving conveyor, a plurality of mandrels removably mounted on said conveyor and freely rotatable thereon, means for winding and heat sealing convolute wound tubings on successive mandrels, a printing plate extending in a direction parallel to one stretch of said conveyor at a level such that said mandrels engage said plate along said stretch and are rolled along said plate by the continuous movement of said conveyor, and a continuously moving conveyor carrying inking rollers moving at the same rate as said first named conveyor and engaging said plate to reink the same between successive traverses by said mandrels.

4. Apparatus for making convolute wound tubing from sheet material, comprising, a continuously moving conveyor, a plurality of mandrels removably mounted on said conveyor and freely rotatable thereon, a stationary rolling table extending in a direction parallel to one stretch of said conveyor at a level such that said mandrels engage said table along said stretch, a belt spaced from said table to receive said mandrels therebetween, said belt being driven at a rate substantially equal to the rate of movement of said conveyor and cooperating with said conveyor to roll said mandrels along said table.

5. Apparatus for making convolute wound tubing from sheet material, comprising, a continuously moving conveyor, a plurality of mandrels removably mounted on said conveyor and freely rotatable thereon, a stationary rolling table extending in a direction parallel to one stretch of said conveyor at a level such that said mandrels engage said table along said stretch, a belt spaced from said table to receive said mandrels therebetween, said belt being driven at a rate substantially equal to the rate of movement of said conveyor and cooperating with said conveyor to roll said mandrels along said table, and a printing plate extending in a direction parallel to one stretch of said conveyor at a level such that said mandrels engage said plate along said stretch and are rolled along said plate by the continuous movement of said conveyor.

BORIS BOGOSLOWSKY.

REFERENCES CITED

The following references are of record in the file of this patent:

UNITED STATES PATENTS

| Number | Name | Date |
| --- | --- | --- |
| 1,284,297 | Frederick | Nov. 12, 1918 |
| 2,027,102 | Hommel et al. | Jan. 7, 1936 |
| 2,273,889 | Perkins | Feb. 24, 1942 |